United States Patent [19]

Tokuda et al.

[11] Patent Number: 4,720,165
[45] Date of Patent: Jan. 19, 1988

[54] OPTICAL FIBER SHEET AND METHOD AND APPARATUS FOR FABRICATION THEREOF

[75] Inventors: Shuichiro Tokuda; Noriyuki Furukawa, both of Nagoya; Ikuo Kinoshita, Kasugai; Hideo Nakamoto; Fumito Aosai, both of Nagoya, all of Japan

[73] Assignee: Mitsubishi Rayon Company Ltd., Tokyo, Japan

[21] Appl. No.: 776,884

[22] Filed: Sep. 17, 1985

[30] Foreign Application Priority Data

Feb. 25, 1985 [JP] Japan .............................. 60-035593
May 23, 1985 [JP] Japan .............................. 60-109278

[51] Int. Cl.⁴ ............................................. G02B 6/04
[52] U.S. Cl. ................................................. 350/96.24
[58] Field of Search ............... 350/96.10, 96.24, 96.25, 350/96.26, 96.27

[56] References Cited

U.S. PATENT DOCUMENTS 3,091,561  5/1963  Marzocchi et al. ......... 350/96.24 X
3,717,531  2/1973  Smith ........................ 350/96.24 X
3,729,356  4/1973  Carpenter ................... 350/96.24 X Primary Examiner—Eugene R. LaRoche
Assistant Examiner—Steven J. Mottola
Attorney, Agent, or Firm—Oblon, Fisher, Spivak, McClelland & Maier

[57] ABSTRACT

A method for the fabrication of an optical fiber sheet, which comprises supplying a number of optical fibers, arranging them in a plane so that they do not intersect one another, holding the optical fibers by a tool having a clearance slightly larger than the size of the fibers, constringing the fibers in the held portion in the lateral direction to bring them close to one another so that the fibers are contacted with one another, and applying an adhesive to the contacted portion of the fibers and solidifying the adhesive to fix the fibers in the sheet-like form, an apparatus for carrying out the method and an optical fiber sheet prepared according to the method.

7 Claims, 13 Drawing Figures

OPTICAL FIBER SHEET AND METHOD AND APPARATUS FOR FABRICATION THEREOF

BACKGROUND OF THE INVENTION (1) Field of the Invention

The present invention relates to an optical fiber sheet comprising a number of optical fibers arranged and gathered in a plane and bonded and fixed with an adhesive and also to a method and apparatus for continuously fabricating this sheet.

(2) Description of the Related Art

A sheet comprising a number of optical fibers arranged and gathered in a plane can be widely used as a two-dimensional information medium and a product formed by laminating both the ends of this sheet with a high precision can be widely used as a three-dimensional information medium. In this sheet-like article, the optical fibers should be arranged in a plane so that adjacent fibers are substantially contacted with one another (this state will be called "closest state"). As the conventional means for increasing the arrangement density of optical fibers, there can be mentioned a method using a warper used in the weaving process and a method for applying an adhesive by a sizing machine or a roll coater.

When only a reed of a warper is used as the arrangement means according to the conventional technique, sufficient increase of the arrangement density cannot be attained, and if it is intended to forcibly increase the arrangement density, there arises a risk of damaging the fibers. Furthermore, the above-mentioned conventional adhesive-applying technique is not preferred because the order of arranged fibers is readily disturbed.

SUMMARY OF THE INVENTION

We made research with a view to solving the above mentioned problem, and as the result, we succeeded in preparing a uniform sheet-like article in which a number of optical fibers are arranged in the densest state by adopting a method comprising applying an adhesive to a number of optical fibers while arranging them in the closest state.

More specifically, in accordance with the present invention, there is provided a method for the fabrication of an optical fiber sheet-like article, which comprises supplying a number of optical fibers, arranging them in a plane so that they do not intersect one another, holding the optical fibers by a tool having a clearance slightly larger than the size of the fibers, constringing the fibers in the held portion in the lateral direction to bring them close to one another so that the fibers are contacted with one another, and applying an adhesive to the contacted portion of the fibers and solidifying the adhesive to fix the fibers in the sheet-like form. Furthermore, in accordance with the present invention, there are provided an apparatus for carrying out the above-mentioned method and an optical fiber sheet prepared according to the above-mentioned method.

DESCRIPTION OF THE PREFERRED EMBODIMENTS

Figure 1A:
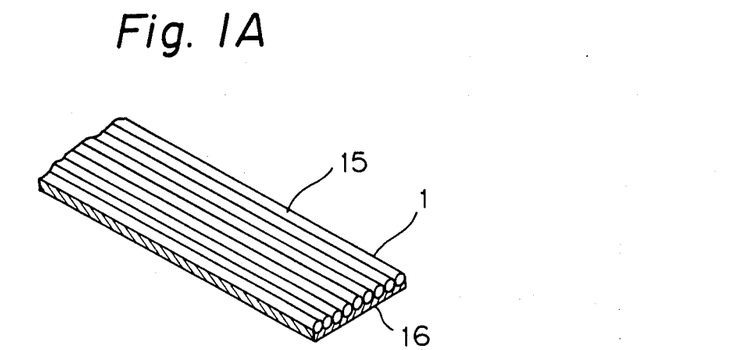
FIGS. 1A and 1B are perspective views showing the optical fiber sheet according to the present invention.
Figure 1B:
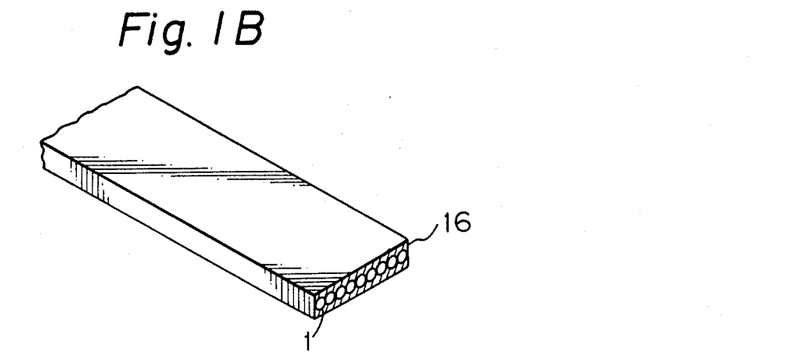

The present invention will now be described in detail with reference to the accompanying drawings. FIGS. 1A and 1B are perspective views showing the appearance of an optical fiber sheet-like article according to the present invention, in which FIG. 1A shows a sheet-like article having one surface bonded and FIG. 1B shows a sheet-like article having both the surfaces bonded. In the drawings, reference numeral 1 represents an optical fiber and reference numeral 15 represents a fiber bundle in which a number of optical fibers 1 are arranged in a plane so that adjacent fibers are contacted with one another or substantially contacted with one another. In FIG. 1A, an adhesive layer 16 is formed on one surtace of the fiber bundle 15, and in FIG. 1B, adhesive layers 16 are formed on both the surfaces of the fiber bundle 15 to interpose the fiber bundle 15 therebetween. The kind of optical fiber that can be used in the present invention is not particularly critical in the present invention. However, optical fibers of the plastic type are especially effective in the present invention. The size of the optical fiber is not particularly critical.

Figure 2:
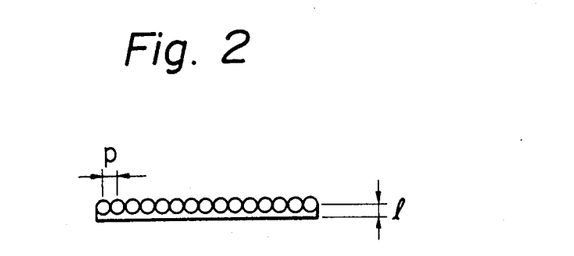
FIG. 2 is a sectional view showing the optical fiber sheet according to the present invention.

FIG. 2 is a side view illustrating the end face of the optical fiber sheet (one surface-bonded type) of the present invention. The pitch P between adjacent optical fibers 1 and the thickness 1 of the adhesive layer are not particularly critical. According to the method of the present invention, the pitch between adjacent fibers becomes substantially equal to the fiber diameter, and the thickness of the adhesive layer 16 should be determined according to the properties of the used adhesive and the required properties of the sheet-like article.

The adhesive used in the present invention is applied in the liquid state to the fibers and is then solidified by heating or other means, and the kind of fiber is not particularly critical, so far as the adhesive can bond optical fibers sufficiently. Ordinarily, two component adhesives, especially rapid-curing two component adhesives, such as a combination of an epoxy resin and a polyamine and a combination of a hydroxyl group-containing oligoester resin and a polyisocyanate, may be used. Furthermore, there may be used liquid adhesives formed by dissolving, emulsifying or dispersing a thermoplastic resin in an appropriate volatile solvent, for example, solutions and emulsions of an acrylic resin, a polyvinyl acetate resin, a polyurethane resin or an epoxy resin in a low-boiling-point solvent such as isopropyl alcohol or ethyl acetate. Moreover, there may be used adhesives of the radial polymerization type composed mainly of an ultraviolet ray-curable resin such as epoxy (meth)acrylate, urethane (meth)acrylate or oligoester (meth)acrylate, and adhesives of the cation polymerization type composed mainly of a low-molecular-weight epoxy resin.

The method and apparatus for fabricating the above-mentioned sheet-like article will now be described in detail with reference to FIG. 3 and subsequent FIGS.

Figure 3:
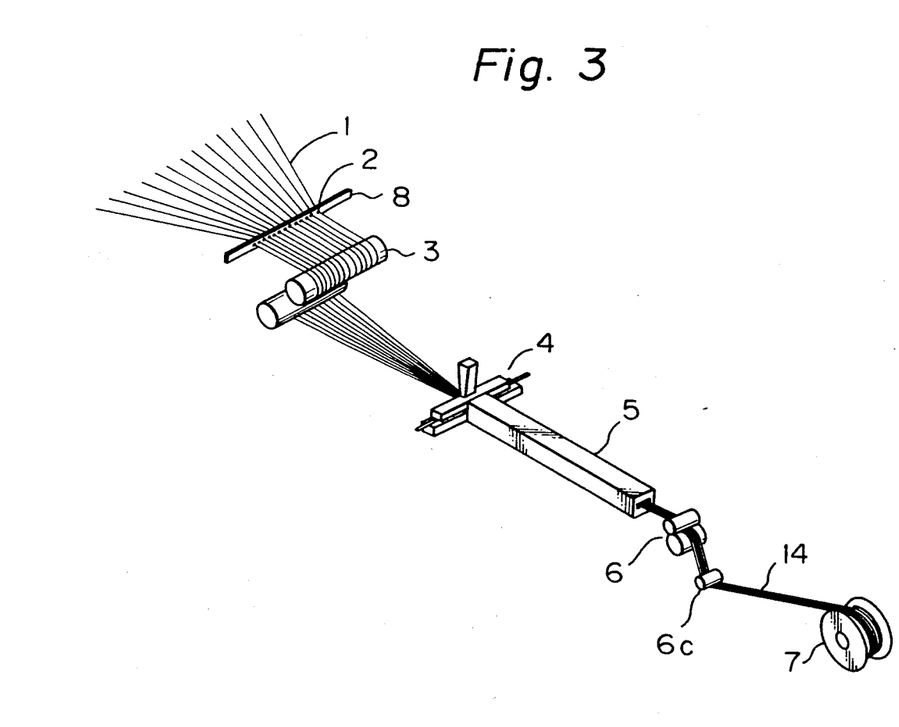
FIG. 3 is a perspective view illustrating the basic technique of the method and apparatus according to the present invention.

According to the method of the present invention, for example, as shown in FIG. 3, a number of optical fibers 1 are taken out from many creels (not shown) of a fiber supply stand and are passed through an arrangement guide 2 and arranged in one plane spaced from one another (so that they do not intersect one another). Then, the spacedly arranged fibers are passed through a feed roll 3 and a predetermined tension is given to the fibers, and the fibers are fed into a gathering tool 4. In the gathering tool 4, the spacedly arranged fibers are brought close to one another so that they are contacted with one another, and the adhesive is applied to the fibers. Thus, there is formed a sheet-like article in which optical fibers are arranged in parallel to one another in the state where they are contacted with one another and they are attached to one another by the adhesive. The sheet-like article is then fed into an adhesive solidifier 5 where the fibers are tightly bonded and secured to one another. The so-prepared sheet-like article 14 of optical fibers is taken out from the adhesive solidifier 5 by a take-up roller 6 and wound on a winder 7 through a guide roll 6c.

The respective members will now be described in detail. In the embodiment illustrated in FIG. 3, the arrangement guide 2 comprises annular guides composed of a ceramic material or the like, which are arranged substantially equidistantly. For example, a reed of a warper used in the weaving process may be used instead of the arrangement guide 2. In short, any structure may be adopted, so far as a number of optical fibers 1 can be arranged in a plane substantially equidistantly and this state is not easily disturbed afterward. The feed roll 3 and take-up roll 6 are a pair of rolls, each having a driving portion having a predetermined effective width, and in the embodiment illustrated in FIG. 3, the feed roll 3 has a structure in which S-figured hanging is possible, and the take-up roll 6 is a nip roll.

Ordinarily, nip rolls are used in a method similar to the method of the present invention, and nip rolls may be used as both of the rolls 3 and 6 in the present invention. However, in the case where the optical fibers 1 are passed through the feed roll 3 separately from one another, it is indispensable that no unnecessary force should be imposed on the fibers. From this viewpoint, it is preferred that the roll shown in FIG. 3 be used as the feed roll 3.

Figure 4:
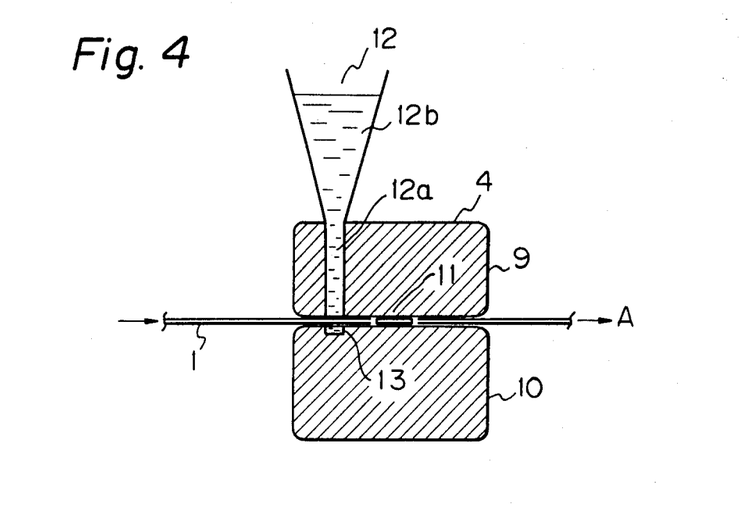
FIGS. 4, 5A, 5B and 6 are sectional views of the gathering tool section as shown in FIG. 3.
Figure 5A:
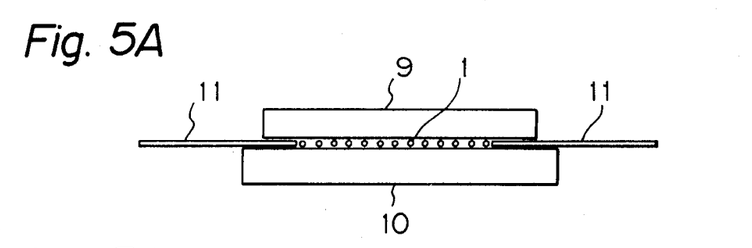
Figure 5B:
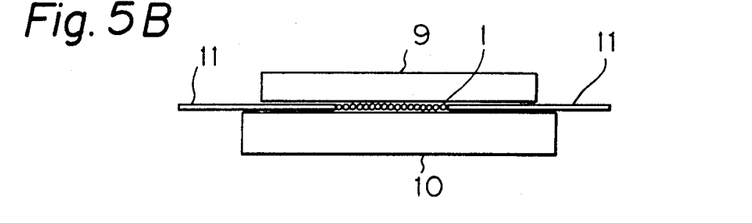
Figure 6:
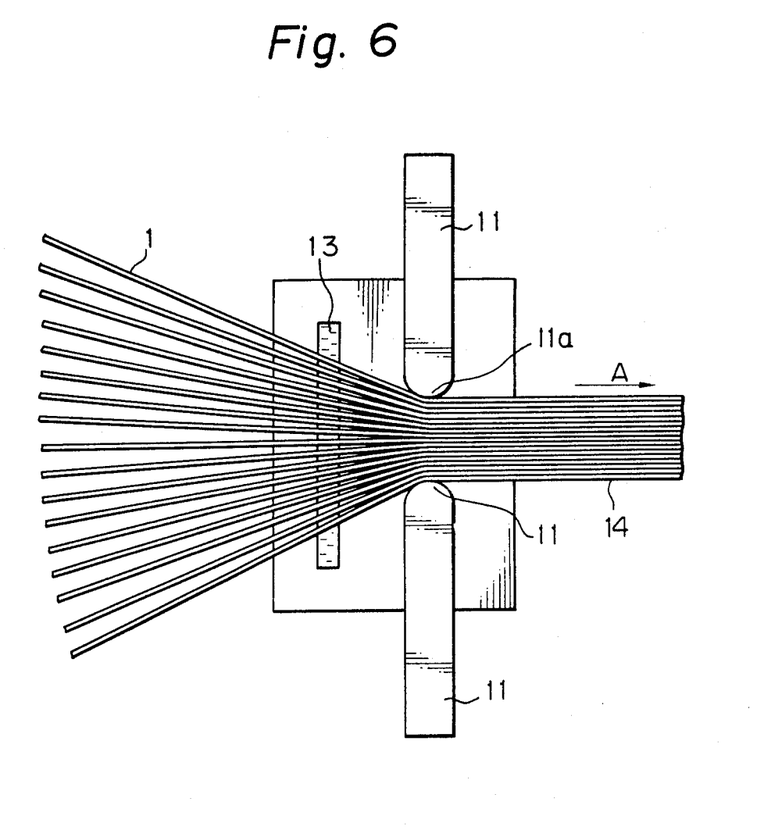

The optical fiber gathering tool used in the present invention comprises, for example, as shown in FIGS. 4 through 6, a lower plate 10 having a top planar surface for guiding the fibers, an upper plate 9 having a lower planar surface confronting the top planar surface of the lower plate 10 in parallel thereto with a certain clearance therebetween, a pair of gauge plates 11 having top end faces 11a confronting each other across a predetermined path for the fibers interposed therebetween, and adhesive applying means arranged upstream of the gauge plates 11 with respect to the advance direction (indicated by arrow A) of the fibers and opened between the upper and lower plates or only to the upper plate.

The clearance between both the upper and lower plates is set so that the clearance is slightly larger than the size of the fibers. If the clearance is excessively large, while the fibers pass through this clearance, the fibers are overlapped or intersect one another. If the clearance is extremely small, the fibers fall in contact with the upper and lower plates and the freedom of the movement of the fibers which are brought close to one another is reduced. Accordingly, it is preferred that the clearance between the upper and lower plates be 1.01 to 1.1 times as large as the size of the fibers.

A pair of the gauge plates 11 are arranged so that the above-mentioned clearance as the path for the fibers between the upper and lower plates is interposed between the gauge plates 11. A width-constringing passage having an exit with a width corresponding to the desired width of the sheet is formed between the confronting top end faces 11a of the paired gauge plates 11. Namely, the spacedly arranged fibers 1 are guided by the top planar surface of the lower plate 10, introduced into the width-constringing passage between a pair of the gauge plates 11 while the width of the arranged fibers is narrowed (that is, the fibers are brought close to one another), and brought into the closest state where the fibers are substantially contacted with one another when the fibers pass through the exit of this passage.

It is preferred that the clearance between the upper and lower plates be freely adjustable according to the diameter of the fibers, and that the gauge plates be exchangeable with other gauge plates having an appropriate thickness according to the adjusted clearance. Moreover, it is preferred that the gauge plates be exchangeable for ones having the appropriate top end shape and size according to the desired size and shape of the width-constringing passage. Furthermore, it is preferred that the gauge plates can be displaced according to the desired size and shape of the width-constringing passage and be fixed at a desired position.

As shown in FIGS. 5A and 5B, when the fibers 1 are supplied to the inlet of the width-constringing passage formed between a pair of the gauge plates 11 [see FIG. 5A], the fibers are arranged on a plane spacedly from one another, and while the fibers are advanced in the width-constringing passage, the width of the fiber assembly is gradually reduced (the fibers are brought close to one another). When the fibers separate from the width-constringing passage [see FIG. 5B], the fibers are substantially contacted with one another and an integrated sheet-like article is formed.

It is generally preferred that when the width of the fiber assembly is constringed, the angle of the axis of the advance direction of the fiber assembly to the advance direction of the fiber arranged on the outermost side (hereinafter referred to as "constringing angle") be 2° to 10°. If the constringing angle is too large, the difference of the length of the advance course between the fibers arranged in the central portion and the fibers arranged on the outer side becomes great and hence, the difference of the imposed tension between these fibers becomes large. If the constringing angle is too small, the fibers become contacted with one another before they arrive at the width-constringing passage or they are likely to intersect one another, and good results cannot be obtained.

In the present invention, the operation of applying the adhesive to the spacedly arranged fibers is performed just before or after the fibers arrive at the inlet of the width-constringing passage. If the adhesive is applied to the fibers before the inlet of the width-constringing passage, the adhesive is applied before the densest state is brought about in the fibers, and therefore, the adhesive sufficiently permeates into clearances among the fibers and the bonding strength is increased. Accordingly, this method is suitable for the fabrication of a sheet-like article of the type where both the surfaces are bonded. If the adhesive is applied after the exit of the width-constringing passage, since the densest stage has already been produced in the fibers and there are no substantial clearances among the fibers, the adhesive is applied only to one surface. Accordingly, this method is suitable for the fabrication of a sheet of the one surface-bonded type. Incidentally, the former method is illustrated in FIGS. 4 and 6.

Referring to FIG. 4, the adhesive applying means 12 is arranged upstream of the gauge plates 11 in close proximity thereto. The adhesive applying means 12 comprises an adhesive reservoir 13 opened to the top planar surface of the lower plate 10, an adhesive supply slit 12a opened to the lower planar surface of the upper plate 9 and an adhesive tank 12b for supplying the adhesive to the reservoir 13 and slit 12a. The adhesive stored in the adhesive reservoir 13 is sucked to the running fiber assembly 1 from the side of the lower face thereof. Furthermore, the adhesives flows down on the side of the upper face of the running fiber assembly from the supply slit 12a, whereby the adhesive is applied to the fibers.

It is indispensable that the length of the adhesive supply slit 12a and adhesive reservoir 13 should be slightly larger than the width of the fiber assembly running above and below the adhesive reservoir 13 and supply slit 12a. This length is appropriately determined so that a desired amount of the adhesive is applied to the fibers according to the running speed of the fiber assembly and the properties of the adhesive (the viscosity, the compatibility with the fibers and the like). In the case where a sheet-like article of the one surface-bonded type is prepared, it is preferred that the reservoir 13 be omitted.

If the clearance among the fibers are too large when the fibers fall in contact with the adhesive, the amount of the adhesive held and carried away by the fibers becomes excessive and the excessive adhesive flows over the width-constringing passage. In contrast, if the clearances among the fibers are too small, the amount of the adhesive carried away by the fibers is too small and bonding among the fibers becomes insufficient. Accordingly, it is preferred that the adhesive be applied at a position where the width of the separately arranged fiber assembly is 1.005 to 1.2 times as large as the width of the intended sheet-like article.

In the case where the adhesive is applied on the side of the exit of the width-constringing passage, since the fibers have already been arranged in the densest state and the clearance among the fibers are substantially zero and since this state is continued afterward, the position for application of the adhesive is not particularly critical. However, since it is preferred that the adhesive be applied before the arrangement of the fibers is disturbed, it is necessary that the adhesive should be applied at a position as close to the exit of the width-constringing passage as possible.

Figure 7:
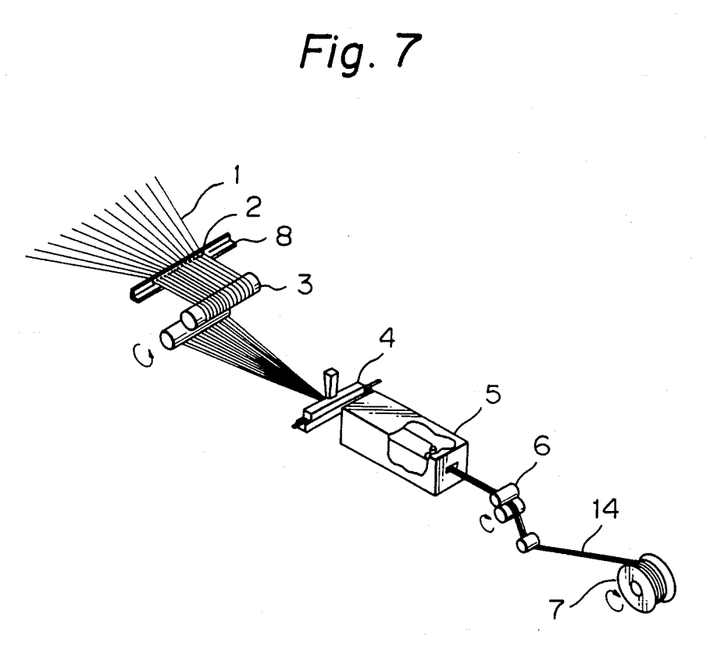
FIGS. 7 and 8 are perspective views illustrating preferred embodiments of the method and apparatus according to the present invention.
Figure 8:
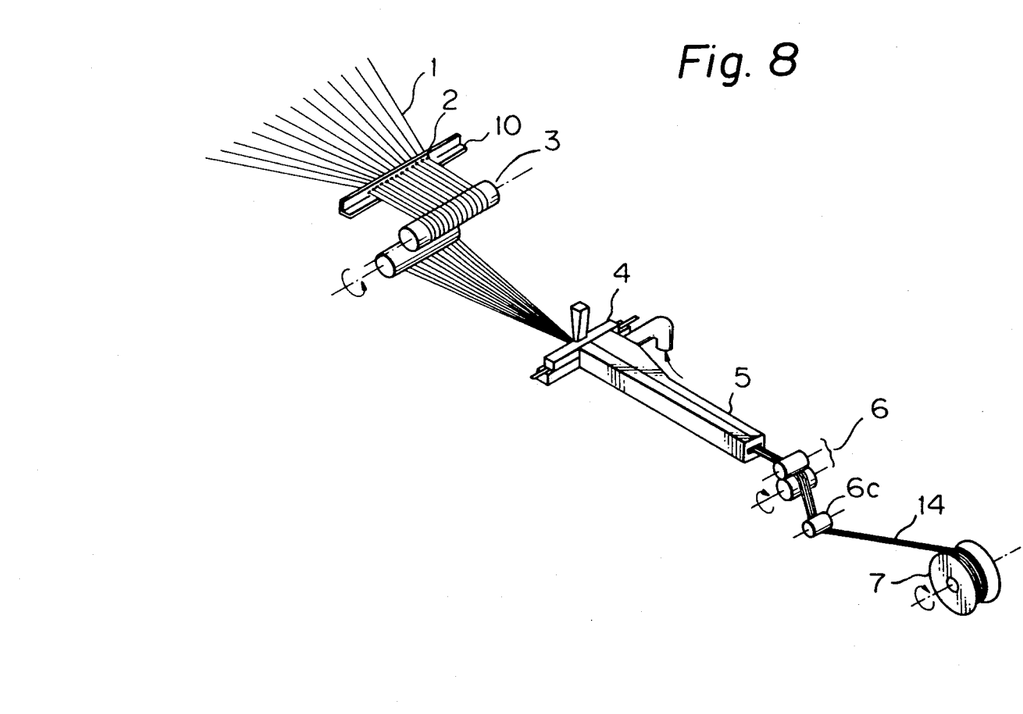

The adhesive solidifier 5 that can be used in the present invention includes two types, that is, an ultraviolet ray emitting device as shown in FIG. 7 and an ordinary hot air drier as shown in FIG. 8.

Under ordinary conditions, the hot air drier shown in FIG. 8 is sufficient. However, when a hot air temperature necessary for curing the adhesive is so high that bad influences are given to the optical fiber or when an ultraviolet ray-curable resin is used as the adhesive, it is necessary to use the ultraviolet ray emitting device shown in FIG. 7. The solidifier 5 has ordinarily a structure extended along the direction of flow of the fibers as shown in FIGS. 7 and 8, and the length or thermal capacity of the solidifier, that is, the solidifying capacity, should be appropriately set according to the processing speed, the width of the sheet and the kind and amount coated of the adhesive.

Figure 9:
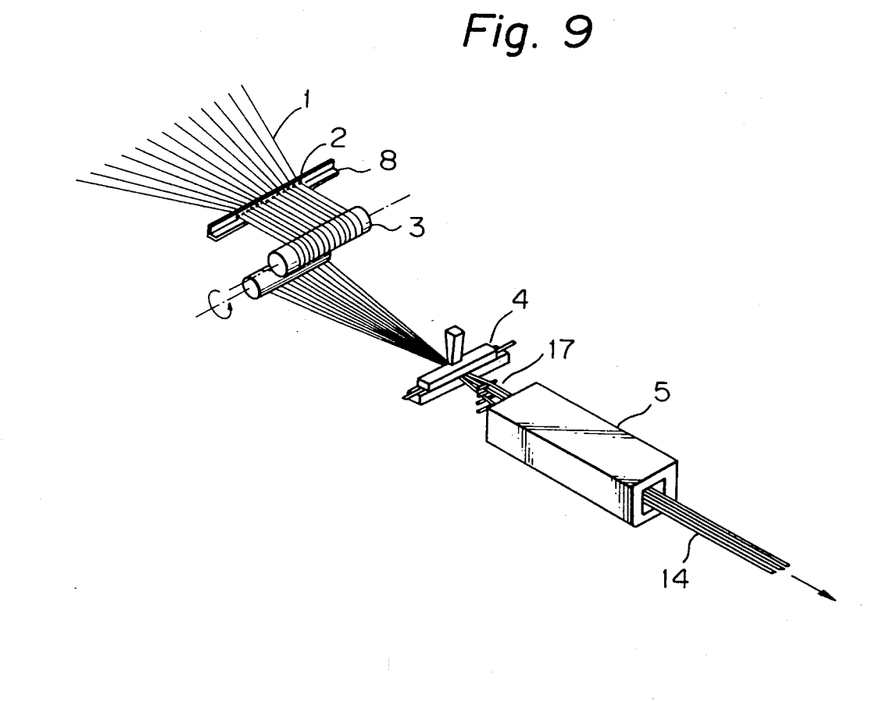
FIGS. 9 and 10 are perspective and sectional views showing the method and apparatus for preparing a plurality of sheet-like articles at one time.
Figure 10:
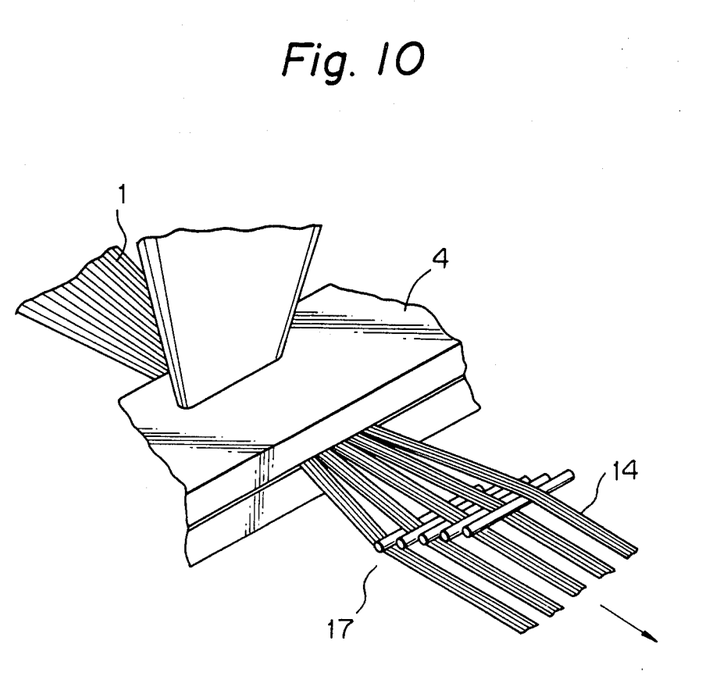

In the foregoing embodiment, one optical fiber sheet-like article 14 is prepared at one time. As means for increasing the productivity, there can be mentioned an embodiment in which a plurality of sheet-like articles are manufactured at one time basically according to the above-mentioned method. The method and apparatus for carrying out this embodiment will now be described. This embodiment is illustrated in FIG. 9. The fundamental structure of this emodiment is the same as that of the embodiment shown in FIG. 3, but this embodiment is different from the embodiment shown in FIG. 3 in that a sheet divider 17 is arranged upstream or downstream of the adhesive solidifier 5. FIG. 10 is an enlarged view illustrating the portion surrounding the sheet divider 17. The sheet divider 17 comprises a plurality of dividing pins (five pins in FIG. 10). The dividing pins are secured to a base such as a handle (not shown), and they are arranged substantially equidistantly so that they extend in the direction rectangular or substantially rectangularly to the advance direction of the sheet. The size and material of the dividing pins are not particularly critical, and it is sufficient if the dividing pins have such diameter and surface smoothness that the fibers which run while they are slightly bent on the dividing pins are not fatally damaged by the dividing pins.

For tearing a sheet, there may be ordinarily considered a method in which the sheet is torn in the lateral direction (in the plane of the sheet in the direction rectangular to the longitudinal direction) and a method in which the sheet is torn in the direction rectangular to the above direction (in the direction rectangular to the longitudinal direction and also rectangular to the face of the sheet). In the present invention, the latter method is preferably adopted because tearing is accomplished without disturbing the arrangement state of the fibers. In the embodiment shown in FIG. 10, tearing is carried out according to the preferred latter method. More specifically, in the case where the fibers are guided to the sheet divider 17 in the state where the adhesive is not cured as shown in FIG. 9 (or FIG. 10), if the sheet-like article is forcibly torn in the lateral direction, there is a risk of disturbance of the fibers. Accordingly, the latter tearing method is preferred. However, if the sheet divider 17 is arranged downstream of the adhesive solidifier 5, since the adhesive is already solidified when tearing is performed, somewhat focible tearing is permissible, and any of the above-mentioned two methods can be adopted.

Figure 11:
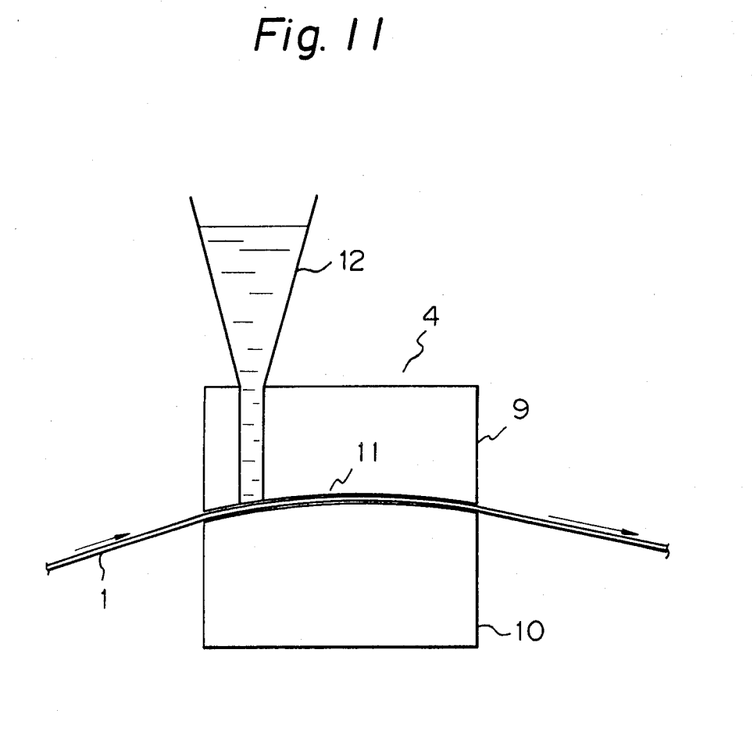
FIG. 11 is a sectional view illustrating the embodiment in which a gathering tool having concave and convex faces is used.

As means for increasing the fiber arrangement precision, there can be mentioned a gathering tool 4 having concave and convex faces as shown in FIG. 11. The tool 4 shown in FIG. 11 is different from the tool shown in FIG. 4 in that confronting faces of the upper and lower plates in FIG. 11 are a pair of concave and convex faces while the confront faces of the upper and lower plates in FIG. 4 are plain faces. In FIG. 11, the upper plates 9 has a concave face and the lower plate 10 has a convex face, but in the reverse case, the intended effect is similarly attained. As shown in FIG. 11, the optical fibers 1 are guided slightly upwardly into the gathering tool 4 on the left side, and the optical fibers 1 are taken out from the tool 4 slightly downwardly on the right side. In this case, the optical fibers 1 are passed through the interior of the gathering tool 4 while they are kept in contact with the convex face of the lower plate 10. Accordingly, the passage position of the fibers is more stabilized than in case of the planar faces shown in FIG. 4, and the arrangement state of the fibers is stabilized with a high precision. The shape of the concave and convex faces is not particularly critical, so far as the above-mentioned effect is attained, and the curvature and the configuration of the corners may be appropriately determined. However, it is necessary that the confronting concave and convex faces should be matched with each other so that the clearance between the two faces is kept constant.

As is apparent from the forgoing description, in the optical fiber sheet-like article of the present invention, the characteristic properties of carbon fibers as the starting fibers can be effectively utilized and the mechanical properties such as the bonding strength and modulus can be freely designed, and the width of the sheet-like article can be freely set by selecting an appropriate number of optical fibers. Moreover, a sheet-like article of the one surface-bonded type and a sheet of the two surfaces-bonded type can be freely manufactured according to the intended use. By dint of these characteristic features, either a two-dimensional light-transmitting medium or a three-dimensional light-transmitting medium can be advantageously provided according to the present invention. Therefore, the present invention is very valuable from the industrial viewpoint.

Furthermore, the above-mentioned method and apparatus for fabricating excellent sheets as described above according to the present invention are novel and industrially valuable method and apparatus in which sheet can be continuously manufactured by supplying a number of optical fibers.

We claim:

1. A method for the fabrication of an optical fiber sheet, which comprises the steps of:
   holding a number of optical fibers arranged on one plane spaced from one another by a tool having a clearance slightly larger than the size of the fibers,
   constringing the held portions of the fibers in a lateral direction to bring them close to one another so that the fibers are contacted with one another while remaining in one plane,
   applying an adhesive to the held portions of the fibers, and
   solidifying the adhesive to fix the fibers.

2. A method according to claim 1, wherein the adhesive is an ultraviolet ray-curable resin.

3. A method according to claim 1 or 2, wherein just before or just after solidification of the adhesive, the formed sheet is divided in the lateral direction to prepare a plurality of sheets simultaneously.

4. A method according to claim 1 or 2, wherein a surface of the tool for holding the fibers has a bent path defined by confronting convex and concave faces.

5. An apparatus for the fabrication of an optical fiber sheet-like article, which comprises:
   an arrangement guide comprising means for arranging a number of optical fibers in a plane at a predetermined pitch,
   a supply roll comprising means for supplying the optical fibers,
   a gathering tool comprising means for constringing the optical fibers in a lateral direction to bring them close to one another so that they are contacted with one another in a single plane and also for applying an adhesive to the fibers,
   a solidifier comprising means for solidifying the applied adhesive,
   a take-up roller comprising means for taking up the formed sheet-like article, and
   a winder comprising means for winding the sheet thereon.

6. An apparatus according to claim 5, wherein the solidifier is an ultraviolet ray lamp.

7. An apparatus according to claim 5 or 6, wherein a sheet divider is arranged contiguously to an inlet or exit of the solidifier.

* * * * *